(12) United States Patent
Kuchibhotla et al.

(10) Patent No.: US 12,391,620 B2
(45) Date of Patent: Aug. 19, 2025

(54) BATCH MIXTURES CONTAINING PRE-REACTED INORGANIC PARTICLES AND METHODS OF MANUFACTURE OF CERAMIC BODIES THEREFROM

(71) Applicant: CORNING INCORPORATED, Corning, NY (US)

(72) Inventors: Huthavahana Sarma Kuchibhotla, Milpitas, CA (US); Christophe Michel Remy, Canandaigua, NY (US); Patrick David Tepesch, Corning, NY (US); Elizabeth Marie Vileno, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 989 days.

(21) Appl. No.: 17/297,296

(22) PCT Filed: Nov. 21, 2019

(86) PCT No.: PCT/US2019/062523
§ 371 (c)(1),
(2) Date: May 26, 2021

(87) PCT Pub. No.: WO2020/112469
PCT Pub. Date: Jun. 4, 2020

(65) Prior Publication Data
US 2022/0024822 A1 Jan. 27, 2022

Related U.S. Application Data

(60) Provisional application No. 62/773,233, filed on Nov. 30, 2018.

(51) Int. Cl.
*C04B 35/478* (2006.01)
*C04B 35/64* (2006.01)

(52) U.S. Cl.
CPC ............ *C04B 35/478* (2013.01); *C04B 35/64* (2013.01); *C04B 2235/3217* (2013.01);
(Continued)

(58) Field of Classification Search
CPC .................. C04B 35/478; C04B 35/64; C04B 2235/3217; C04B 2235/3236;
(Continued)

(56) References Cited

U.S. PATENT DOCUMENTS 3,885,977 A 5/1975 Lachman et al.
5,332,703 A 7/1994 Hickman
(Continued)

FOREIGN PATENT DOCUMENTS

CN 101553446 A 10/2009
CN 105939982 A 9/2016
(Continued)

OTHER PUBLICATIONS

International Search Report and Written Opinion of the International Searching Authority; PCT/US19/62523; Mailed Mar. 2, 2020; 13 Pages; European Patent Office.
(Continued)

*Primary Examiner* — Amber R Orlando
*Assistant Examiner* — Cameron K Miller
(74) *Attorney, Agent, or Firm* — Kevin M. Able

(57) ABSTRACT

A batch mixture comprising pre-reacted pseudobrookite particles consisting essentially of aluminum titanate and magnesium dititanate, a reactive alumina source, a reactive titania source, and a reactive silica source. Other batch mixtures and methods of manufacturing honeycomb extrudates and porous honeycomb bodies using the batch mixture are disclosed.

26 Claims, 5 Drawing Sheets

(52) U.S. Cl.
CPC ............ *C04B 2235/3236* (2013.01); *C04B 2235/3418* (2013.01); *C04B 2235/76* (2013.01); *C04B 2235/786* (2013.01)

(58) Field of Classification Search
CPC ........ C04B 2235/3418; C04B 2235/76; C04B 2235/786
See application file for complete search history.

(56) References Cited

U.S. PATENT DOCUMENTS

| | | | |
|---|---|---|---|
| 6,101,793 | A | 8/2000 | Nagai et al. |
| 6,221,308 | B1 | 4/2001 | Peng |
| 6,259,078 | B1 | 7/2001 | Araya |
| 6,391,813 | B1 | 5/2002 | Merkel |
| 6,541,407 | B2 | 4/2003 | Beall et al. |
| 7,017,278 | B2 | 3/2006 | Kato |
| 7,596,885 | B2 | 10/2009 | Adrian et al. |
| 8,673,044 | B2 | 3/2014 | Nemoto et al. |
| 8,974,724 | B2 | 3/2015 | Day et al. |
| 9,005,517 | B2 | 4/2015 | Bronfenbrenner et al. |
| 9,038,284 | B2 | 5/2015 | Feldman et al. |
| 9,335,093 | B2 | 5/2016 | Feldman et al. |
| 9,446,560 | B2 | 9/2016 | Bronfenbrenner et al. |
| 9,452,578 | B2 | 9/2016 | Bronfenbrenner et al. |
| 2014/0339744 | A1 | 11/2014 | Backhaus-Ricoult et al. |
| 2015/0143786 | A1* | 5/2015 | Merkel ............... C04B 38/06 264/43 |
| 2017/0362128 | A1* | 12/2017 | Backhaus-Ricoult ............... C04B 35/62645 |
| 2018/0127316 | A1* | 5/2018 | Sarma ............... B01J 21/04 |
| 2021/0094885 | A1* | 4/2021 | Backhaus-Ricoult ............... C04B 35/632 |

FOREIGN PATENT DOCUMENTS

| | | |
|---|---|---|
| EP | 2241536 A1 | 10/2010 |
| EP | 2598964 A1 | 6/2013 |
| WO | 2008/066765 A1 | 6/2008 |
| WO | 2009/122537 A1 | 10/2009 |
| WO | 2012/012819 A1 | 2/2012 |
| WO | 2014/046912 A1 | 3/2014 |

OTHER PUBLICATIONS

Chinese Patent Application No. 201980090820.5, Office Action dated Jun. 6, 2022, 5 pages (English Translation Only), Chinese Patent Office.

* cited by examiner

BATCH MIXTURES CONTAINING PRE-REACTED INORGANIC PARTICLES AND METHODS OF MANUFACTURE OF CERAMIC BODIES THEREFROM

This is a national stage application under 35 U.S.C. § 371 of International Application No. PCT/US2019/062523, filed on Nov. 21, 2019, which claims the benefit of priority under 35 U.S.C. § 119 of U.S. Provisional Application Ser. No. 62/773,233 filed on Nov. 30, 2018, the content of which is incorporated herein by reference in its entirety.

FIELD

The present disclosure relates to batch mixtures including pre-reacted inorganic particles and methods of manufacturing ceramic bodies therefrom.

BACKGROUND

Porous ceramic honeycomb bodies comprise a plurality of intersecting porous walls and can be utilized as flow-through substrates in catalytic converters and plugged to form plugged honeycomb bodies for use in particulate filters, both of which can be provided as part of an exhaust after-treatment system.

SUMMARY

In one or more embodiments, the present disclosure provides aluminum-titanate (AT)-containing honeycomb bodies formed from a batch mixture comprising pre-reacted pseudobrookite particles. The pre-reacted pseudobrookite particles consist essentially of aluminum titanate and magnesium dititanate.

In another embodiment, the present disclosure provides a batch mixture comprising: pre-reacted pseudobrookite particles; a reactive alumina source; a reactive titania source; and a reactive silica source. The pre-reacted pseudobrookite particles consist essentially of aluminum titanate and magnesium dititanate.

In another embodiment, the present disclosure provides a batch mixture comprising pre-reacted pseudobrookite particles; a reactive alumina source; a reactive titania source; a reactive magnesia source; and a reactive silica source. The pre-reacted pseudobrookite particles consist essentially of 70 wt. % to 99 wt. % of aluminum titanate and 1 wt. % to 30 wt. % of magnesium dititanate.

In another embodiment, the present disclosure provides a method of manufacturing a honeycomb body comprising: providing pre-reacted pseudobrookite particles that consist essentially of aluminum titanate and magnesium dititanate; mixing the pre-reacted pseudobrookite particles with a reactive alumina source, a reactive titania source, and a reactive silica source to form a batch mixture; and extruding the batch mixture through an extruder to form a honeycomb extrudate. AT- and strontium aluminosilicate (SAS)-containing bodies and AT- and Cordierite-containing bodies can be produced from the batch mixture.

Additional features of the disclosure will be set forth in the description which follows, and will be apparent from the description, or may be learned by practice of the disclosure. It is to be understood that both the foregoing general description and the following detailed description provide example embodiments and are intended to provide further explanation of the disclosure.

BRIEF DESCRIPTION OF THE DRAWINGS

The accompanying drawings, which are included to provide a further understanding of the disclosure, and are incorporated in and constitute a part of this specification, illustrate example embodiments of the disclosure, and together with the description serve to explain the principles of the disclosure.

DETAILED DESCRIPTION

Figure 1:
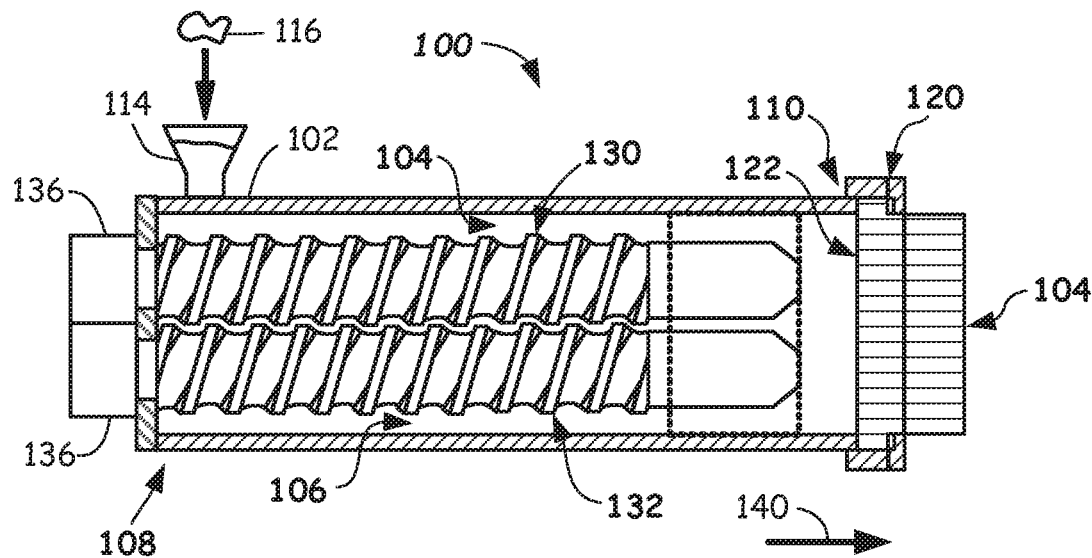
FIG. 1 schematically illustrates a cross-sectioned side view of an extruder apparatus configured to extrude honeycomb bodies from different batch mixtures according to one or more embodiments of the disclosure.

Embodiments of the disclosure are described more fully hereinafter with reference to the accompanying drawings. This disclosure may, however, be embodied in many different forms and should not be construed as being limited to the embodiments set forth herein. Rather, these disclosed embodiments are provided so that this disclosure is thorough and complete. In the drawings, the size and relative sizes may not be drawn to scale. Like reference numerals in the drawings are used throughout the disclosure to denote like elements.

Some honeycomb bodies are used in filter applications wherein some of the channels in the honeycomb body are plugged with a plugging material, which forces gas flow through porous walls forming the channels. Accordingly, the porous walls can filter particulates entrained in the gas flow. In order to achieve low back pressure through the honeycomb bodies, the walls of the honeycomb structure can comprise a porous microstructure comprising relatively high porosity and/or relatively high median pore diameter. The porous honeycomb bodies may also be suited to other applications. For example, honeycomb bodies can be used as flow through substrates in catalytic converters where the porous walls can have a catalyst material disposed thereon, such as an in-the-wall or on-the-wall catalyst-containing washcoat.

The relatively high porosity and/or relatively high median pore diameter of the walls can cause thermo-mechanical problems with the honeycomb bodies due to lower thermal capacity of such high porosity walls. For example, the high porosity can in some cases cause relatively higher coefficients of thermal expansion (CTEs) in the honeycomb bodies and the honeycomb structures therein. As the honeycomb bodies undergo heating and cooling, the honeycomb bodies can experience high expansion and contraction because of the high CTEs, which can cause the honeycomb bodies to crack. One issue with conventional AT honeycomb bodies is that CTEs are currently at a minimum that conventional batch mixtures can support. For example, higher porosity AT honeycomb bodies can result in relatively high CTE due to smaller domains broken up by higher porosity walls formed from conventional batch mixtures.

The batch mixtures disclosed herein comprise a unique pre-reacted PB content, which increases the heat capacity of AT-containing honeycomb bodies that are formed from these batch mixtures. For example, the pre-reacted PB particles described herein can, in some embodiments, function as a seed component for other inorganic components present within the batch mixture. Accordingly, a small weight percentage of the pre-reacted PB particles may result in porous AT-containing honeycomb bodies having quite low CTEs. In some embodiments, the axial CTE of the instant honeycomb bodies is reduced relative to conventional AT-containing honeycomb bodies, which can increase the tangential CTE. This combination of axial and tangential CTEs can increase the durability of the AT-containing honeycomb bodies as they are subjected to thermal cycles in use. For example, the CTE of resulting honeycomb bodies may be about $8.2 \times 10^{-7}/°$ C. or less measured from 25° C. to 800° C. Some embodiments can comprise CTE of about $5.0 \times 10^{-7}/°$ C. or less, about $3.0 \times 10^{-7}/°$ C. or less, or even about $0.0 \times 10^{-7}/°$ C. or less (negative CTE), all measured from 25° C. to 800° C.

In addition to the foregoing, one or more embodiments of the present disclosure provide batch mixtures can form honeycomb bodies with lower CTEs, which when plugged can exhibit lower back pressures than like honeycomb bodies formed from conventional batch mixtures. In addition, the time at top soak during firing of these honeycomb bodies may advantageously be less than for conventional honeycomb bodies.

One or more embodiments of the present disclosure comprise a batch mixture that comprises pre-reacted PB particles (e.g., pre-reacted by being fired or calcined) consisting essentially of AT and magnesium dititanate (MT2). The batch mixture used to form honeycomb bodies described herein may comprise pre-reacted PB particles, reactive inorganic materials, and organic materials. The pre-reacted PB particles consisting essentially (or solely) of AT and MT2 can comprise a desired ceramic crystalline phase composition prior to being provided to the batch mixture, i.e., are provided as pre-reacted particles in the batch mixture.

The pre-reacted PB particles and other reactive inorganic particles in the batch mixture are expressed herein in terms of wt. %, based on 100% of the weight of all the inorganic materials in the batch mixture. As used herein, "wt. % SAP" means by super-addition to 100% of the inorganic materials contained in the batch mixture. Some organic materials, specifically the pore formers, in the batch mixture are added as SAP. Other organic materials, specifically the processing aids, may be added by wt. % SAT. As used herein, "wt. % SAT" means by super-addition to the total weight of the batch inorganics plus any pore formers used.

The pre-reacted PB particles herein may be manufactured by, for example, firing pellets, spheroids, or granules of material containing a PB-forming batch mixture at a high temperature sufficient to form pseudobrookite consisting essentially of aluminum titanate (AT) and magnesium dititanate (MT2), or even solely of aluminum titanate (AT) and magnesium dititanate (MT2). One method of forming the pre-reacted PB particles comprises dry mixing an alumina source, a titania source, and a magnesia source. A small amount of silica ($SiO_2$) can be added to the batch to increase the reaction rate and reduce the firing time or peak firing temperature. The alumina source can be $Al_2O_3$, or optionally can be AlOOH or $Al(H_2O)_3$. The magnesia source can be MgO or optionally $Mg(OH)_2$. The titania source can be $TiO_2$. Any suitable silica source can be used. The median particle diameters of the alumina source, titania source, magnesia source, and silica source can be 0.1 μm to 40 μm, for example. The alumina source, a titania source, and a magnesia source and optional silica source are dry mixed together to form a dry mixture. The weigh percent range for each of the batch components use to produce the PB particles is shown in Table 1 below.

TABLE 1

Weight Percentages of PB-forming batch

| Material | Example (wt. %) | High (wt. %) | Low (wt. %) |
|---|---|---|---|
| Alumina | 40.35% | 55% | 38% |
| $TiO_2$ | 53.32% | 55% | 45% |
| Mg(OH)2 | 7.33% | 9% | 0.6% |
| SiO2 | 0% | 2% | 0% |

The alumina source can range from 38 wt. % to 55 wt. %, based on the total weight of the inorganics in the PB-forming batch mixture. The titania source can range from 45 wt. % to 55 wt. %, based on the total weight of the inorganics in the PB-forming batch mixture. The magnesia source can range from 0.6 wt. % to 9 wt. %, based on the total weight of the inorganics in the PB-forming batch mixture. Up to about 2 wt. % of silica source can be added to the PB-forming batch, based on the total weight of the inorganics in the PB-forming batch mixture.

The material can then formed into a granule structure, a spheroid, or pellet structure to make the green material easy to handle. This can be accomplished by granulation (using water) to form granules, extrusion through a spaghetti die (with about 1%-3% Wt. % SAP of an organic binder (e.g., cellulose-containing binder) and water followed by chopping to form pellets, spray drying, or by any other known forming method. In spray drying processes, green spheroidal particles may be produced by spray-drying and then calcined or fired to form the pre-reacted PB particles. During spray drying, the median particle diameter of the pre-reacted PB particles may be adjusted by changing the solids loading and/or by changing processing parameters such as the spray drying pressure for the fountain nozzle, nozzle size, temperature setting, or the rotation rate of an atomizer nozzle of a spray dryer device, or the type or amount of organic or polymeric binder added when producing the green PB particles.

The granules, spheroids, or spaghetti pellets of PB-forming material can then be fired (e.g., at a soak temperature of greater than about 1500° C., such as from 1500° C. to 1600° C.) followed by a suitable powderizing or pulverizing process to form the desired median particle diameter $d_{50}$ and a desired particle size distribution of the pre-reacted PB particles. Processes such as ping and puck pulverizing, ball milling, powderizing, and jet milling may be used.

In some embodiments, the pre-reacted PB particles may be processed to have a particle size distribution wherein 1.0 µm≤$D_{50}$≤40 µm (including 1.0 µm, 5.0 µm, 10 µm, 15 µm, 20 µm, 25 µm, 30 µm, 35 µm, and 40 µm, and values in between) wherein $D_{50}$ is defined herein as a median particle diameter of the particle size distribution. In other embodiments, the PB particles can have a particle size distribution wherein 5 µm≤$D_{50}$≤40 µm or even wherein 15 µm≤$D_{50}$≤30 µm. In other embodiments, the PB particles can have a particle size distribution wherein $D_{50}$≤40 µm, $D_{50}$≤20 µm, or $D_{50}$≤10 µm, or even $D_{50}$≤5 µm. In some embodiments, very small particles comprising $D_{50}$≤1 µm may be used. 15 µm≤$D_{50}$≤30 µm can be well suited for use in plugged honeycomb bodies to assist in providing a good combination of low back pressure and good filtration efficiency.

The pre-reacted PB particles may comprise a particle size distribution that comprises a large fraction of particles that are below a certain coarse diameter, such as $D_{90}$≤80 µm. In some embodiments, $D_{90}$ may be in a range from 4 µm to 100 µm, or from 50 µm to 80 µm in some embodiments. $D_{90}$ is defined herein as a certain coarse particle diameter of pre-reacted PB particles within the particle size distribution, wherein 90% of the pre-reacted PB particles in the distribution have a diameter that is equal to or less than the coarse diameter, i.e., the remaining particles (approx. 9.9999%) have a larger diameter.

The pre-reacted PB particles can comprise a particle size distribution that comprises a fine fraction of particles that are larger than a certain size, such as where $D_{10}$ ranges from 0.5 µm to 25 µm, or even that range from 1.0 µm to 20 µm in some embodiments. In some coarser embodiments, $D_{10}$≥20 µm. $D_{10}$ is defined herein as diameter of a particle within the particle size distribution, wherein 10% of the pre-reacted PB particles in the particle size distribution have a particle diameter that is equal to or less than the fine diameter, i.e., the remaining (approx. 89.9999%) have a larger diameter.

As described above, in some embodiments, the pre-reacted PB particles in the batch mixture consist essentially of aluminum titanate (AT) and magnesium dititanate (MT2), or even solely of aluminum titanate (AT) and magnesium dititanate (MT2). Minor amounts of common contaminants like oxides of Fe and Ca can be present in 2.0 wt. % SAP or less in the pre-reacted PB particles.

In addition to the pre-reacted PB particles, the batch mixture used to form ceramic honeycomb bodies can comprise other inorganic particles as well as organic components. In a first embodiment, in addition to the pre-reacted PB particles, reactive inorganic components (particles) can be included in the batch mixture and can comprise a reactive alumina source, a reactive titania source, and a reactive silica source. In a second embodiment, reactive inorganic components in the batch mixture can comprise a reactive alumina source, a reactive titania source, a reactive magnesia source, and a reactive silica source. Reactive source as used herein means an inorganic raw material source that will react when fired to form crystalline structures, as opposed to pre-reacted PB particles which have already undergone reaction to for the PB crystalline structure prior to inclusion in the batch.

Table 2A below provides example ranges of the inorganic components that can be in a first embodiment of the batch mixture. Table 2B below provides example ranges of inorganic components that can be in a second embodiment of the batch mixture.

TABLE 2A

Example ranges of inorganic components in the first embodiment of the batch mixture.

| Component | First Range | Second Range | Third Range | Fourth Range |
|---|---|---|---|---|
| Wt. % of Pre-reacted PB particles in batch mixture | ≤50 | 0.01 to 50 | 0.01 to 5.0 | 0.1 to 2.0 |
| AT in PB | 70 to 99 | 70 to 99 | 75 to 82 | 75 to 82 |
| MT2 in PB (wt. %) | 1 to 30 | 1 to 30 | 18 to 25 | 18 to 25 |
| PB median particle diameter (µm) | ≤40 | ≤20 | ≤10 | ≤10 |
| Reactive Titania (wt. %) | 10 to 40 | 10 to 40 | 20 to 32 | 25 to 32 |
| Reactive Alumina (wt. %) | 20 to 55 | 20 to 55 | 30 to 55 | 40 to 55 |
| Reactive Silica (wt. %) | 5 to 20 | 5 to 20 | 6 to 15 | 6 to 11 |

TABLE 2B

Example ranges of inorganic components in the second embodiment of the batch mixture.

| Component | First Range | Second Range | Third Range | Fourth Range |
|---|---|---|---|---|
| Wt. % of Pre-reacted PB particles in batch mixture | ≤50 | 0.01 to 50 | 2 to 50 | 10 to 50 |
| AT in PB | 70 to 99 | 70 to 99 | 75 to 82 | 75 to 82 |
| MT2 in PB (wt. %) | 1 to 30 | 1 to 30 | 18 to 25 | 18 to 25 |
| PB median particle diameter (µm) | 5 to 40 | 10 to 35 | 10 to 35 | 10 to 35 |
| Reactive Titania (wt. %) | 10 to 35 | 15 to 35 | 15 to 32 | 15 to 25 |
| Reactive Alumina (wt. %) | 15 to 50 | 25 to 45 | 28 to 45 | 30 to 45 |
| Reactive Silica Sources (wt. %) | 5 to 20 | 6 to 20 | 6 to 18 | 6 to 15 |
| Reactive Magnesia Sources (wt. %) | 2 to 10 | 2 to 10 | 2 to 10 | 2 to 9 |

Embodiments of the batch mixture can comprise components other than or in addition to those described in Table 2A and Table 2B. In some embodiments, the reactive titania source can comprise titanium dioxide. The reactive titania source can comprise a particle size distribution having a median particle diameter $d_{50}$ of between about 0.10 µm and 0.5 µm, and about 0.3 µm in some embodiments. The reactive titania source can comprise 10 wt. % to 40 wt. %, or even 10 wt. % to 35 wt. % based on a total amount of inorganics in the batch mixture. In other embodiments, the reactive titania source can comprise 20 wt. % to 34 wt. % of a total amount of inorganics in the batch mixture, or even 15 wt. % to 32 wt. %, for example.

The reactive alumina source can comprise calcined alumina, hydrated alumina, and/or aluminum oxide. The reactive alumina source can comprise particles comprising a median particle diameter in the range of from 1 µm to 40 µm, or in the range from 5 µm to 30 µm in some embodiments. The reactive alumina source can comprise a range from 20 wt. % to 55 wt. % based on a total amount of inorganics in the batch mixture.

In other embodiments, the reactive silica source comprises a range from 5 wt. % to 20 wt. %, or even from 6 wt. % to 15 wt. % based on a total amount of inorganics in the batch mixture. The reactive silica source can comprise crystalline silica and/or talc.

In addition to the foregoing components, the batch mixture can also comprise a sintering aid. The sintering aid can comprise such as an oxide of strontium, an oxide of calcium, and/or an oxide from the lanthanide series (e.g., lanthanum and cerium). Examples of suitable batches are shown in Tables 3-5 herein. Some batch mixtures can comprise combinations of an oxide of strontium, an oxide of calcium, and an oxide of lanthanum, such as $SrCO_3$, $CaCO_3$ and $La_2O_3$.

Further, organic materials such as a pore former (e.g., starch and/or graphite), and processing aids such as an organic binder, a lubricant, and/or a surfactant may be provided in the batch mixture. Example embodiments comprising different components in the batch mixtures are described in detail below.

Table 3 below describes batch mixture components with very small amounts of the pre-reacted particles, such as less than 0.5 wt. % (e.g., 0.1 wt. % and 0.2 wt. %) and parameters of low porosity (e.g., P % less than or equal to 50%) honeycomb bodies formed therefrom. Such small amounts can act as seed components and can effectively lower CTE.

Table 4 describes components of the batch mixture with 1 wt. %, 9 wt. %, and 33 wt. % pre-reacted PB particles and parameters of low porosity honeycomb bodies formed therefrom. Tables 3 and 4 also describe examples of organic components and inorganic components of the batch mixtures, firing conditions of the green honeycomb bodies, resulting crystalline structures, and specifications (CTE, % P, $d_{10}$, $d_{50}$, $d_{90}$) of the resulting honeycomb bodies. For example, Tables 3 and 4 show the CTEs from room temperature to 800° C. (RT-800° C.) and the CTEs from room temperature to 1000° C. (RT-1000° C.) of the resulting honeycomb bodies.

As shown in Tables 3 and 4, the CTEs are quite low, and these may be achieved even with low firing times and low firing temperatures. Such low CTEs can be achieved both with small and large amounts of pre-reacted PB particles consisting essentially of (or solely of) AT and MT2 as described above.

TABLE 3

Batch mixture components with 0.1% and 0.2% pre-reacted PB particles and parameters of low porosity honeycomb bodies formed therefrom.

| | | | | | | | |
|---|---|---|---|---|---|---|---|
| Composition (wt. % inorganics) | $SrCO_3$ | 8.09 | 8.09 | 8.09 | 8.09 | 8.10 | 8.10 |
| | $CaCO_3$ | 1.39 | 1.39 | 1.39 | 1.39 | 1.40 | 1.40 |
| | $Al_2O_3$ | 49.62 | 49.62 | 49.62 | 49.62 | 49.60 | 49.60 |
| | $TiO_2$ | 30.30 | 30.30 | 30.30 | 30.30 | 30.30 | 30.30 |
| | $SiO_2$ | 10.30 | 10.30 | 10.30 | 10.30 | 10.30 | 10.30 |
| | $La_2O_3$ | 0.20 | 0.20 | 0.20 | 0.20 | 0.20 | 0.20 |
| | Pre-reacted PB | 0.10 | 0.10 | 0.10 | 0.10 | 0.20 | 0.20 |
| Organics (wt. % SAP) | Graphite | 3.50 | 3.50 | 3.50 | 3.50 | | |
| | Starch | 8.00 | 8.00 | 8.00 | 8.00 | 10.80 | 10.80 |
| Processing Aids (wt. % SAT) | Binder | 4.50 | 4.50 | 4.50 | 4.50 | 4.20 | 4.20 |
| | Fatty Acid | 1.00 | 1.00 | 1.00 | 1.00 | 1.10 | 1.10 |
| Firing Conditions | Top Soak Temperature (° C.) | 1429 | 1425 | 1429 | 1425 | 1408 | 1428 |
| | Time at Top Soak (hrs.) | 4 | 8 | 12 | 16 | 8 | 8 |
| Thermal Expansion | CTE (25° C. to 800° C.), $10^{-7}/°$ C. | 4.1 | 2.7 | 1.7 | 0.2 | 4.7 | 2.6 |
| | CTE (25° C. to 1000° C.), $10^{-7}/°$ C. | 9.1 | 7.5 | 6.3 | 4.8 | 9.3 | 6.8 |
| Pore Structure | Porosity (%) | 46.7 | 46.9 | 46.4 | 46.5 | 46.1 | 45.9 |
| | $d_{50}$ (μm) | 13.9 | | | 14.1 | 12.33 | 14.44 |
| | $d_{10}$ (μm) | 10.30 | | | 10.25 | 8.17 | 10.29 |
| | $d_{90}$ (μm) | 19.48 | | | 20.05 | 17.74 | 22.06 |
| Fired Honeycomb Body Crystalline Phases (Wt. %) | PB (AT + MT2) | 69.0 | 72.0 | 71.0 | | 67.0 | 69.6 |
| | Corundum | 7.2 | 6.2 | 6.2 | | 8.9 | 6.0 |
| | Rutile | 0.9 | 0.2 | 0.3 | | 1.8 | 0.7 |
| | Triclinic SAS | 22.7 | 22.0 | 22.0 | | 22.0 | 23.5 |

Surprisingly, small amounts of pre-reacted PB particles in the batch mixture, such as less than or equal to 0.2%, act as seeds and can actually lower the CTE as compared to conventional batches.

TABLE 4

Batch mixture components with 1 wt. %, 9 wt. %, and 33 wt. % pre-reacted PB particles and parameters of low porosity honeycomb bodies formed therefrom.

| | | | | | |
|---|---|---|---|---|---|
| Composition (wt. % inorganics) | $SrCO_3$ | 8.02 | 7.36 | 7.36 | 5.40 | 5.40 |
| | $CaCO_3$ | 1.38 | 1.26 | 1.26 | 0.93 | 0.93 |
| | $Al_2O_3$ | 49.17 | 45.15 | 45.15 | 33.11 | 33.11 |

TABLE 4-continued

Batch mixture components with 1 wt. %, 9 wt. %, and 33 wt. % pre-reacted PB particles and parameters of low porosity honeycomb bodies formed therefrom.

| | | | | | | |
|---|---|---|---|---|---|---|
| | $TiO_2$ | 30.03 | 27.57 | 27.57 | 20.22 | 20.22 |
| | $SiO_2$ | 10.21 | 9.37 | 9.37 | 6.87 | 6.87 |
| | $La_2O_3$ | 0.20 | 0.18 | 0.18 | 0.13 | 0.13 |
| | Pre-reacted PB | 1.00 | 9.09 | 9.09 | 33.33 | 33.33 |
| Organics (wt. % SAP) | Graphite | 3.50 | 3.50 | | 3.50 | 3.50 |
| | Starch | 8.00 | 7.25 | | 7.25 | 7.25 |
| Processing Aids (wt. % SAT) | Binder | 4.50 | 3.80 | | 3.80 | 3.80 |
| | Fatty Acid | 1.00 | 1.00 | | 1.00 | 1.00 |
| Firing Conditions | Top Soak Temp. (° C.) | 1425 | 1408 | 1428 | 1408 | 1428 |
| | Time at Top Soak (hrs.) | 16 | 8 | 8 | 8 | 8 |
| Thermal Expansion | CTE (25° C. to 800° C.) $10^{-7}$/° C. | 0.8 | 3.7 | 1.4 | −2.3 | −6.1 |
| | CTE (25° C.-1000° C.) $10^{-7}$/° C. | 5.6 | 8.1 | 5.8 | 1.5 | −1.8 |
| Pore Structure | Porosity (%) | 47.1 | 47.3 | 46.6 | 45.7 | 45.3 |
| | $d_{50}$ (μm) | 14.0 | 13.0 | 14.2 | 13.2 | 14.1 |
| | $d_{10}$ (μm) | 10.31 | 7.90 | 10.26 | 8.54 | 10.62 |
| | $d_{90}$ (μm) | 19.75 | 20.31 | 22.06 | 25.95 | 20.75 |
| Fired Honeycomb Body Crystalline Phases (Wt. %) | PB (AT + MT2) | | 71.0 | 73.3 | 80.0 | 82.3 |
| | Corundum | | 7.0 | 5.1 | 3.7 | 2.3 |
| | Rutile | | 0.9 | 0.5 | 0.0 | 0.2 |
| | Triclinic SAS | | 21.0 | 20.9 | 16.0 | 15.2 |

As can be seen the Table 4, wt. % of the pre-reacted PB particles above 10 wt. % can provide exceeding low or even negative CTE (25° C. to 800° C.) $10^{-7}$/° C.

Table 5 below describes different batch mixture components with 5 wt. %, 9 wt. %, and 33 wt. % pre-reacted PB particles and parameters of high porosity (e.g., porosity of greater than or equal to 50%) honeycomb structures formed therefrom. Table 5 includes many of the parameters described above in Tables 3 and 4. For example, Table 5 shows the CTEs from room temperature to 800° C. (25° C. to 800° C.) and the CTEs from room temperature to 1000° C. (25° C.-1000° C.) of the resulting honeycomb bodies. As shown in Table 5, the CTEs are quite low, even with low firing times and low firing (soak) temperatures. Such low CTEs are achieved with small and large amounts of pre-reacted PB particles in the batch mixture, wherein the pre-reacted PB particles consist essentially of AT and MT2, or even solely of AT and MT2, as described above.

TABLE 5

Batch mixture components with 5 wt. %, 9 wt. %, and 33 wt. % pre-reacted PB particles and parameters of high porosity honeycomb structures formed therefrom.

| | | | | | | |
|---|---|---|---|---|---|---|
| Composition (wt. % inorganics) | $Al_2O_3$ | 39.7 | 37.9 | 37.9 | 27.8 | 27.8 |
| | $TiO_2$ | 31.5 | 30.1 | 30.1 | 22.1 | 22.1 |
| | $SiO_2$ | 2.9 | 2.7 | 2.7 | 2.0 | 2.0 |
| | Talc | 19.8 | 18.9 | 18.9 | 13.8 | 13.8 |
| | $CeO_2$ | 1.39 | 1.32 | 1.32 | 0.97 | 0.97 |
| | Pre-reacted PB | 4.76 | 9.09 | 9.09 | 33.33 | 33.33 |
| Organics (wt. % SAP) | Graphite | 10.0 | 10.0 | 10.0 | 10.0 | 10.0 |
| | Starch | 28.0 | 28.0 | 28.0 | 28.0 | 28.0 |
| Processing Aids (wt. % SAT) | Binder | 4.5 | 4.5 | 4.5 | 4.5 | 4.5 |
| | Fatty Acid | 1.0 | 1.0 | 1.0 | 0.7 | 0.7 |
| Firing Conditions | Top Soak Temp. (° C.) | 1355 | 1340 | 1355 | 1340 | 1355 |
| | Time at Top soak (hrs.) | 22 | 22 | 22 | 22 | 22 |
| Thermal Expansion | CTE (25° C. to 800° C.), $10^{-7}$/° C. | 8.2 | 9.0 | 7.4 | 6.4 | 4.6 |
| | CTE (25° C. to 1000° C.), $10^{-7}$/° C. | 11.9 | 12.9 | 10.6 | 10.0 | 7.9 |

TABLE 5-continued

Batch mixture components with 5 wt. %, 9 wt. %, and 33 wt. % pre-reacted PB particles and parameters of high porosity honeycomb structures formed therefrom.

| Pore Structure | Porosity (%) | 57.1 | 61.4 | 60.3 | 61.6 | 59.7 |
|---|---|---|---|---|---|---|
| | $d_{50}$ (μm) | | 17.7 | 20.4 | 19.22 | 21.34 |
| | $d_{10}$ (μm) | | 14.8 | 17.3 | 15.60 | 17.82 |
| | $d_{90}$ (μm) | | 22.4 | 25.8 | 24.68 | 26.72 |
| Fired Honeycomb Body Crystalline Phases (Wt. %) | PB (AT + MT2) | 65.8 | 66.8 | 67.7 | 74.2 | 73.3 |
| | Corundum | 2.2 | 3.4 | 2.4 | 2.8 | 2.2 |
| | Rutile | 0.2 | 0.9 | 0.2 | 0.3 | 0.0 |
| | Cordierite | 24.9 | 24.4 | 24.5 | 18.6 | 18.2 |
| | Mullite | 5.1 | 2.9 | 3.8 | 2.8 | 5.1 |
| | Cerianite | 0.3 | 0.2 | 0.2 | 0.1 | 0.2 |
| | $CeTi_2O_6$ | 1.4 | 1.4 | 1.4 | 1.0 | 1.0 |

The low CTE values exhibited by these batch mixtures are surprising because they cannot be achieved by equivalent batch mixtures using recycled AT material, i.e. particles obtained from milled or ground fired AT-containing honeycomb bodies, such as described in U.S. Pat. No. 8,974,724, for example.

In some embodiments, the batch mixture comprises one or more pore formers. A pore former is a particulate organic material that can be included in the batch mixture that burns out during firing and produces open interconnected porosity in the fired ceramic article (e.g., in the porous ceramic honeycomb body). In particular, the pore former can comprise a single pore former material or a combination of pore former materials. The pore former may be included in the batch mixture in a range from 5 wt. % to 50 wt. % SAT based on a total amount of inorganics in the batch mixture.

In some embodiments, the one or more pore formers can comprise a starch, graphite, or a polymer (e.g., polymer beads). In one embodiment, the one or more pore formers comprise a starch, such as pea starch. In embodiments comprising only starch as the organic pore former, the starch may be provided in an amount of from 5 wt. % SAP to 30 wt. % SAP. Other suitable starches that may be used in the batch composition as a pore former comprise potato starch, corn starch, sago starch, bean starch, rice starch, wheat starch, and the like. Starches can be standard starches, cross-linked starches, or highly cross-linked starches, for example.

In other embodiments, the batch composition comprises a combination of pore formers, such as a combination of starch and graphite as pore formers. For example, in some embodiments, the batch composition comprises a combination of starch (e.g., pea starch) as a pore former in an amount from 5 wt. % SAP to 40 wt. % SAP, and graphite as a pore former in an amount from 5 wt. % SAP to 15 wt. % SAP. The pore former may comprise a median particle diameter ranging from 3 μm to 50 μm, depending of the starch type used and whether graphite is used. The pea starch as a pore former can be a very highly cross linked (vhxl) pea starch. For example, a median particle diameter $d_{50}$ of the vhxl pea starch can range from about 24 μm to 28 μm, or about $d_{50}$=26 μm. The graphite may be platy graphite and can comprise plates with a median particle diameter ranging from 25 μm to 40 μm, but may comprise a quite broad particle size distribution. In other example embodiments, the batch mixture can comprise a spherical polymer pore former.

For example, the pore former can comprise a spherical polymer pore former that can comprise a median particle diameter $d_{50}$ of from 15 μm to 35 μm. Other types and amounts of pore former can be used, depending on the desired porosity to be achieved.

The batch mixture can comprise a processing aid such as an organic binder. The organic binder can be, for example, a cellulose-containing binder. In some embodiments, the cellulose-containing binder can be, but is not limited to, methylcellulose, ethylhydroxy ethylcellulose, hydroxybutyl methylcellulose, hydroxymethylcellulose, hydroxypropyl methylcellulose, hydroxyethyl methylcellulose, hydroxybutylcellulose, hydroxyethylcellulose, hydroxypropylcellulose, sodium carboxy methylcellulose, and the like, and combinations of the afore-mentioned. Methylcellulose and/or methylcellulose derivatives are especially suited for use as organic binders for use in the batch mixture with methylcellulose and hydroxypropyl methylcellulose being used. Sources of cellulose ethers are METHOCEL™ cellulose products available from DOW® Chemical Co.

Some embodiments of the batch composition can comprise combinations of methylcellulose and hydroxypropyl methylcellulose. Other combinations of cellulose ether binders can comprise cellulose ethers comprising different molecular weights. Alternatively, the combination of cellulose ethers can comprise cellulose ethers having different hydrophobic groups, different concentrations of the same hydrophobic group, or other cellulose ether combinations. Different hydrophobic groups can be, by way of non-limiting example, hydroxyethyl or hydroxypropyl.

The organic binder can be provided in the batch mixture in an amount of from 3.0 wt. % SAT to % 8.0 wt. % SAT. The organic binder, in some embodiments, comprises a combination of a methylcellulose binder and a hydroxymethylcellulose binder, with from 3.0 wt. % SAT to 6.0 wt. % SAT of the methylcellulose binder, and from 1.5 wt. % SAT to 3.0 wt. % SAT of the hydroxymethylcellulose binder. Some embodiments comprise only hydroxymethylcellulose binder as the organic binder in an amount from 3.0 wt. % SAT to 8.0 wt. % SAT, for example.

The batch mixture can further comprise a processing aid comprising a lubricant, such as an oil lubricant. Non-limiting examples of oil lubricants comprise light mineral oil, corn oil, high molecular weight polybutenes, polyol esters, a blend of light mineral oil and wax emulsion, a blend of paraffin wax in corn oil, combinations of these, and the like. The amount of lubricant can be in a range from 0.5 wt. % SAT to 5 wt. % SAT. In some embodiments, the oil lubricant can be tall oil present in a range from about 0.5 wt. % SAT to 2.5 wt. % SAT in the batch mixture.

Further, the batch mixture can optionally comprise a processing aid comprising a surfactant. Non-limiting examples of surfactants that can be used in the batch mixture are $C_8$ to $C_{22}$ fatty acids and/or their derivatives. Additional surfactant components that can be used with these fatty acids are $C_8$ to $C_{22}$ fatty esters, Cato $C_{22}$ fatty alcohols, and combinations of these. Examples of surfactants comprise stearic, lauric, myristic, oleic, linoleic, palmitoleic acids, and their derivatives, stearic acid in combination with ammonium lauryl sulfate, and combinations of all of these. The amount of surfactants can be in a range from about 0.25 wt. % SAT to about 2 wt. % SAT in the batch mixture.

After being formed by any suitable forming method (e.g., extrusion), a honeycomb extrudate can be dried and fired according to known firing techniques to form an AT-containing honeycomb body. For example, the honeycomb extrudate, after being cut to length to form a green body, may be dried and fired for firing times and at firing temperatures listed in Tables 3-5. The firing conditions effective to convert the honeycomb extrudate into a AT-containing honeycomb body can comprise heating the dried honeycomb extrudate in an air atmosphere in a furnace at heating ramp rate of about 120° C./hr. to a maximum soak temperature. The maximum soak temperature can be in the range of from 1000° C. to 1600° C., for example, depending upon the batch mixture. The maximum soak temperature may be maintained for a hold time of between about 3 to 30 hours, or even between 3 hours and 22 hours, which is sufficient to convert the honeycomb extrudate into the AT-containing honeycomb body. The honeycomb body may, in some embodiments, comprise a predominant crystalline phase of AT, a secondary phase of strontium aluminosilicate (SAS), and usually another phase such as corundum and possibly rutile. In this aluminum titanate-SAS containing body, the AT phase may be present in 65 wt. % to 84 wt. % of the AT-containing honeycomb body, whereas the secondary phase of strontium aluminosilicate (SAS), may be present in 14 wt. % to 25 wt. % of the AT-containing honeycomb body.

The honeycomb body may, in other embodiments, comprise an aluminum titanate-cordierite containing body comprising a predominant crystalline phase of AT, a secondary phase cordierite, and small amounts of one or more other phases, such as such as mullite, corundum and possibly rutile, cerianite, and/or $CeTi_2O_6$. In this aluminum titanate-cordierite containing body, the AT phase may be present in 63 wt. % to 76 wt. % of the AT-containing honeycomb body, whereas the secondary phase of cordierite may be present in 17 wt. % to 26 wt. % of the honeycomb body. Mullite may be present in about 2 wt. % and 5 wt. % of the honeycomb body.

In other embodiments, the firing conditions comprise a peak firing temperature of from 1300° C. to 1600° C. for at least 3.5 hours, or at least 1,330° C. for at least 10 hours. In other embodiments, the firing conditions can comprise a peak firing temperature in a range from 1,350° C. to 1,435° C. for at least 3.5 hours. In some embodiments, the peak firing temperatures may be in a range from 1405° C. to 1435° C. for less than or equal to 8 hours for low porosity honeycomb bodies. As shown above in Tables 3-5, the firing temperatures may be in a range from 1408° C. to 1429° C. for 4 to 8 hours for low porosity honeycomb bodies.

In some embodiments, the firing conditions comprise a peak firing temperature (soak temperature) of at least 1,405° C. for less than or equal to 8 hours, or even less than or equal to 4 hours in some embodiments. In some embodiments, the firing conditions comprise a peak firing temperature (soak temperature) of at least 1,405° C. and less than 1435° C. for at least 3.5 hours and less than or equal to 8 hours.

The firing temperatures may be a range of from 1330° C. to about 1360° C. for less than or equal to 25 hours for high porosity honeycomb bodies, and from 10 hours to 25 hours for example. For example, in some embodiments in Tables 3-5, the firing temperatures were in a range of from 1340° C. to about 1355° C. for about 22 hours for high porosity honeycomb bodies. These firing times and temperatures may be considerably less than firing times and temperatures of conventional honeycomb bodies. The firing can be followed by cooling at a rate sufficiently slow (e.g., a cool down rate of about 10° C./hr. to 160° C./hr.) so as not to thermally shock and crack the honeycomb body.

Reference is now made to FIG. 1, which schematically illustrates a cross-sectioned side view of an embodiment of an extruder apparatus 100 (e.g., a continuous twin-screw extruder) that can be used to extrude the batch mixture described above and form a precursor to the honeycomb body. The extruder apparatus 100 can comprise a barrel 102 comprising a first chamber portion 104 and a second chamber portion 106 formed therein and in communication with each other. The first chamber portion 104 and the second chamber portion 106 extend through the barrel 102 in a longitudinal direction between an upstream side 108 and a downstream side 110. At the upstream side 108 of the barrel 102, a material supply port 114, which can comprise a hopper or other material supply structure, can be provided for supplying the batch mixture 116 to the extruder apparatus 100. The batch mixture 116 can be any of the batch mixtures described herein comprising PB particles that consist essentially AT and MT2 or even solely of AT and MT2. The batch mixture 116 can be provided as pugs of pre-mulled and plasticized batch or as other sized globules, which can be provided continuously or intermittently to the material supply port 114.

A honeycomb extrusion die 120 is provided at a discharge port 122 at the downstream side 110 of the barrel 102 for extruding the batch mixture 116 into a desired shape, such an extrudate comprising a honeycomb structure. The honeycomb extrusion die 120 can be preceded by other structures, such as a generally open cavity, screen/homogenizer (not shown), or the like to facilitate the formation of a steady plug-type flow front before the batch mixture 116 reaches the honeycomb extrusion die 120.

As shown in FIG. 1, a pair of extruder screws may be mounted in the barrel 102. A first screw 130 can be rotatably mounted at least partially within the first chamber portion 104 and a second screw 132 can be rotatably mounted at least partially within the second chamber portion 106. The first screw 130 and the second screw 132 may be arranged generally parallel to each other, as shown, though they may also be arranged at various angles relative to each other. The first screw 130 and the second screw 132 may also be coupled to a driving mechanism outside of the barrel 102 for rotation in the same or different directions. It is to be understood that both the first screw 130 and the second screw 132 may be coupled to a single driving mechanism (not shown) or, as shown, to individual driving mechanisms 136. The first screw 130 and the second screw 132 move the batch mixture 116 through the barrel 102 with pumping and mixing action in an axial direction 140. Further supporting structure (shown dotted) may be provided to support the first screw 130 and the second screw 132 along their lengths.

Such support structure may comprise perforations or holes therein to allow the batch mixture 116 to flow through the support structure.

Figure 2A:
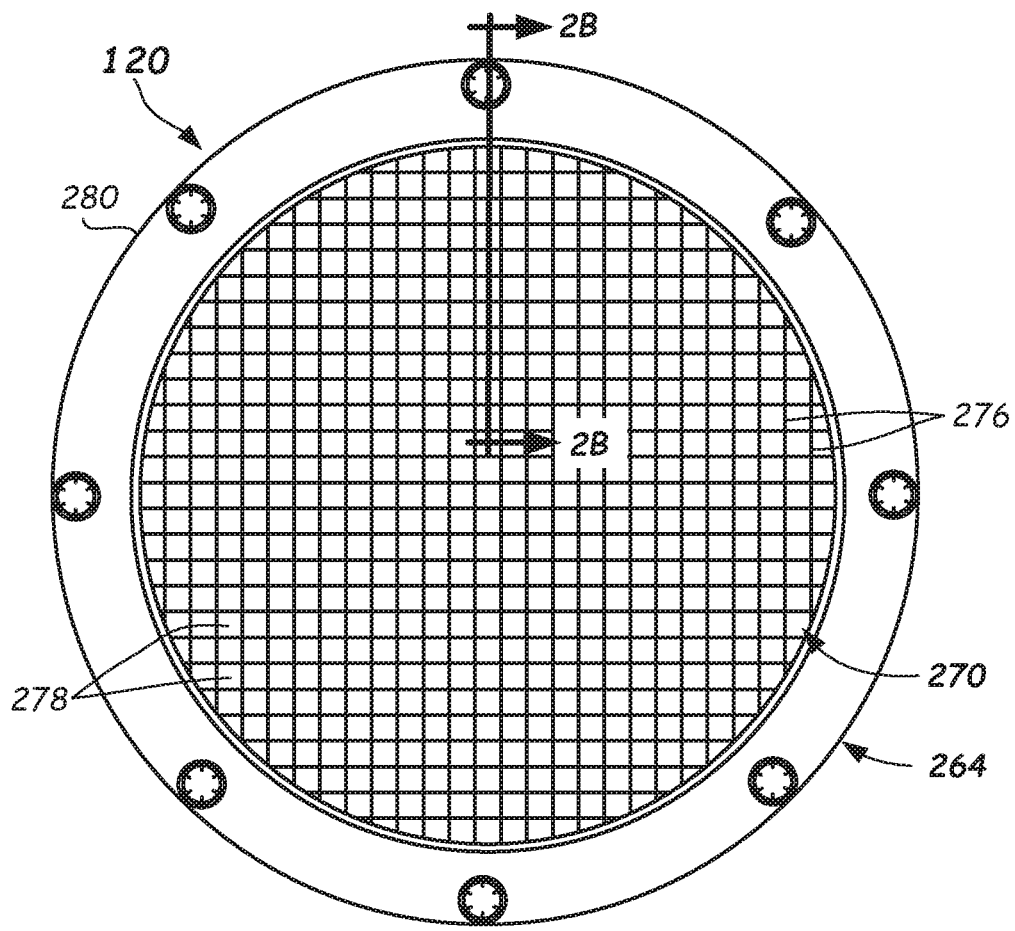
FIG. 2A schematically illustrates a front plan view of an extrusion die configured to extrude honeycomb bodies comprising honeycomb structures according to one or more embodiments of the disclosure.
Figure 2B:
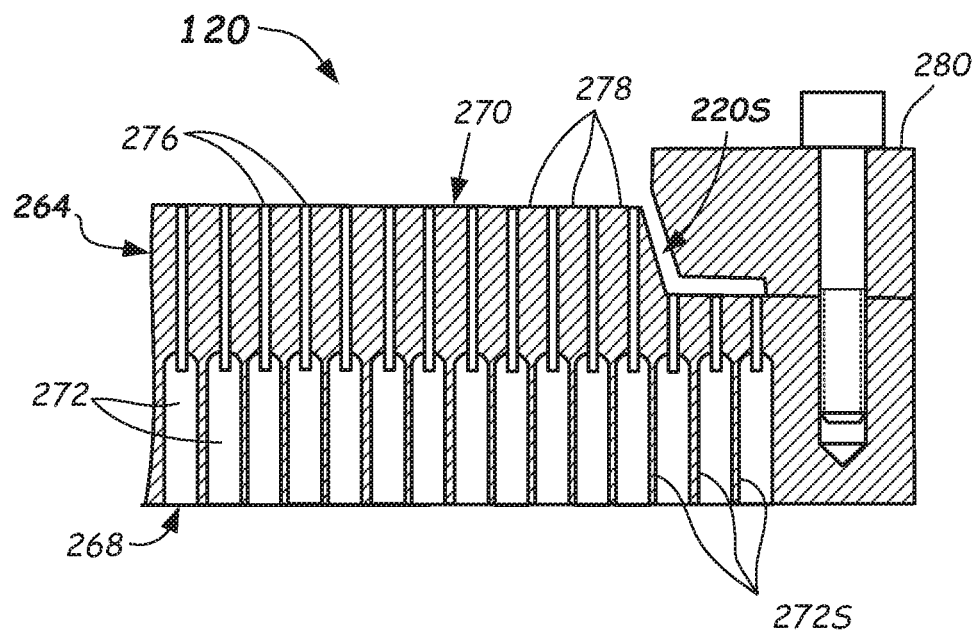
FIG. 2B schematically illustrates a partial cross-sectioned view of the extrusion die of FIG. 2A taken along section line 2B-2B of FIG. 2A according to one or more embodiments of the disclosure.
Figure 3:
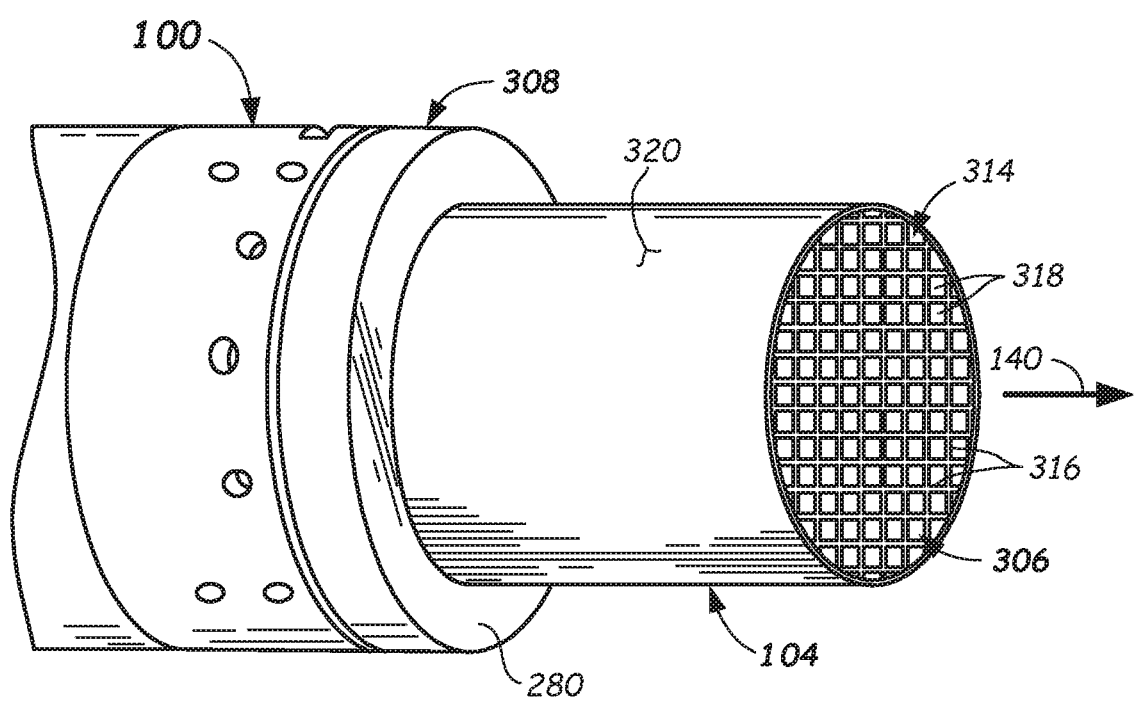
FIG. 3 schematically illustrates a perspective view of a front end of an extruder apparatus shown extruding the batch mixture as a green honeycomb extrudate comprising a honeycomb structure according to one or more embodiments of the disclosure.

FIG. 2A schematically illustrates a front view of the honeycomb extrusion die 120 and FIG. 2B illustrates a cross-sectioned, partial cut away view of the honeycomb extrusion die 120. The honeycomb extrusion die 120 may be configured to manufacture honeycomb extrudates, which may be formed into honeycomb bodies. The honeycomb bodies may be formed by extrusion of the batch mixture 116 through an extruder apparatus 100 (FIG. 1), which is described, for example, in U.S. Pat. Nos. 3,885,977, 5,332,703, 6,391,813, 7,017,278, 8,974,724, WO2014/046912, and WO2008/066765, and through the honeycomb extrusion die 120 to produce a green honeycomb extrudate 104 (FIGS. 1 and 3). The green honeycomb extrudate 104 may then be cut and dried, such as described in U.S. Pat. Nos. 9,038,284, 9,335,093, 7,596,885, and 6,259,078, for example. Other drying processes may be used. The green honeycomb extrudate 104 may then be further cut to a desired part length and fired as described in Tables 3-5 and as described in U.S. Pat. Nos. 9,452,578, 9,446,560, 9,005,517, 8,974,724, 6,541,407, or U.S. Pat. No. 6,221,308, for example, to form a honeycomb body or other honeycomb structures described herein.

The honeycomb extrusion die 120 can comprise a die body 264 such as a metal disc, a die inlet face 268 configured to receive the batch mixture 116 from the extruder apparatus 100, and a die outlet face 270 opposite from the die inlet face 268 and configured to expel plasticized batch mixture 116 in the form of a green honeycomb extrudate 104. The honeycomb extrusion die 120 may comprise a plurality of feedholes 272 (a few labeled) extending from the die inlet face 268 into the die body 264. The plurality of feedholes 272 intersect with an array of slots 276 (a few labeled) extending into the die body 264 from the die outlet face 270. The plurality of slots 276 may comprise a slot thickness measured transversely across the slots 276. The slot thickness may be selected based on the total shrinkage of the batch mixture 116 (FIG. 1) that is used (e.g., shrinkage from extrusion through firing) so that the fired honeycomb body comprises a transverse wall thickness of the intersecting porous walls as described herein. For example, for a nominal extrude-to-fire shrinkage of 10%, the slot thickness may be selected to be up to 10% greater than the transverse wall thickness of the intersecting porous walls.

The plurality of feedholes 272 connect with, and can be configured to feed batch mixture 116 to, the array of slots 276. The array of slots 276 intersect with one another and themselves as shown in FIG. 2A. The array of slots 276 form an array of die pins 278 (a few labeled) that are arranged in a die pin structure across the die outlet face 270. The density of the die pins 278 may be the same as the channel density of the channels of the honeycomb extrudate 104. For example, the honeycomb extrusion die 120 may comprise a die pin density of 250 die pins per square inch (dppsi) (39 die pins per square centimeter (dppscm) to 450 dppsi (70 dppscm). This corresponds to honeycomb extrudate 104 ranging from 250 cpsi to 450 cpsi, and honeycomb bodies 404 (FIG. 4) with slightly higher channel densities due to the shrinkage.

Each of the die pins 278 may be square or rectangular in transverse cross-sectional shape. The die pins 278 can comprise corner fillets so as to form radiuses in the corners of channels in the honeycomb body 404. The honeycomb extrusion die 120 may comprise a skin-forming portion 220S comprising a skin-forming mask 280 (e.g., a ring-shaped article) that interfaces with batch mixture 116 from skin forming feedholes 272S and recessed skin-forming region outboard of the die outlet face 270 to form an extruded skin 320 on the green honeycomb extrudate formed during the extrusion method.

FIG. 3 schematically illustrates a front end of the extruder apparatus 100 and a green honeycomb extrudate 104 comprising a honeycomb structure 306 being extruded therefrom. An extruder cartridge 308 can be located proximate a front end of the extruder apparatus 100. The extruder cartridge 308 may comprise extrusion hardware such as an extrusion die 120 (FIGS. 2A and 2B) and the skin-forming mask 280. The honeycomb extrudate 104 comprises an end face 314 comprising a cross-sectional shape which can be, for example, circular (as shown), elliptical, race track shaped, square, rectangular non-square, triangular or tri-lobed, hexagonal, octagonal, asymmetrical, symmetrical, or other desired polygonal shapes, and combinations thereof.

The honeycomb extrudate 104 can comprise a matrix of intersecting walls 316 that form a plurality of channels 318. The combination of walls 316 and channels 318 may at least partially constitute the honeycomb structure 306. The walls 316 and channels 318 shown in FIG. 3 may be greatly enlarged for illustration purposes. The walls 316 and channels 318 may extend in the axial direction 140 along the length of the honeycomb extrudate 104, wherein the axial direction 140 is normal to a transverse cross-section of the honeycomb extrudate 104. In some embodiments, the honeycomb extrudate 104 comprises an outer skin 320 that may be extruded with the honeycomb extrudate 104.

The honeycomb extrudate 104 can be cut or otherwise formed into a green honeycomb body. As used herein, green honeycomb body refers to the honeycomb extrudate 104, or honeycomb bodies cut therefrom, prior to firing. Processes, such as drying and firing as described above, may be applied to the wet or green honeycomb body to form a final honeycomb body 404 (FIG. 4A) comprising a honeycomb structure to be further described herein.

Figure 4A:
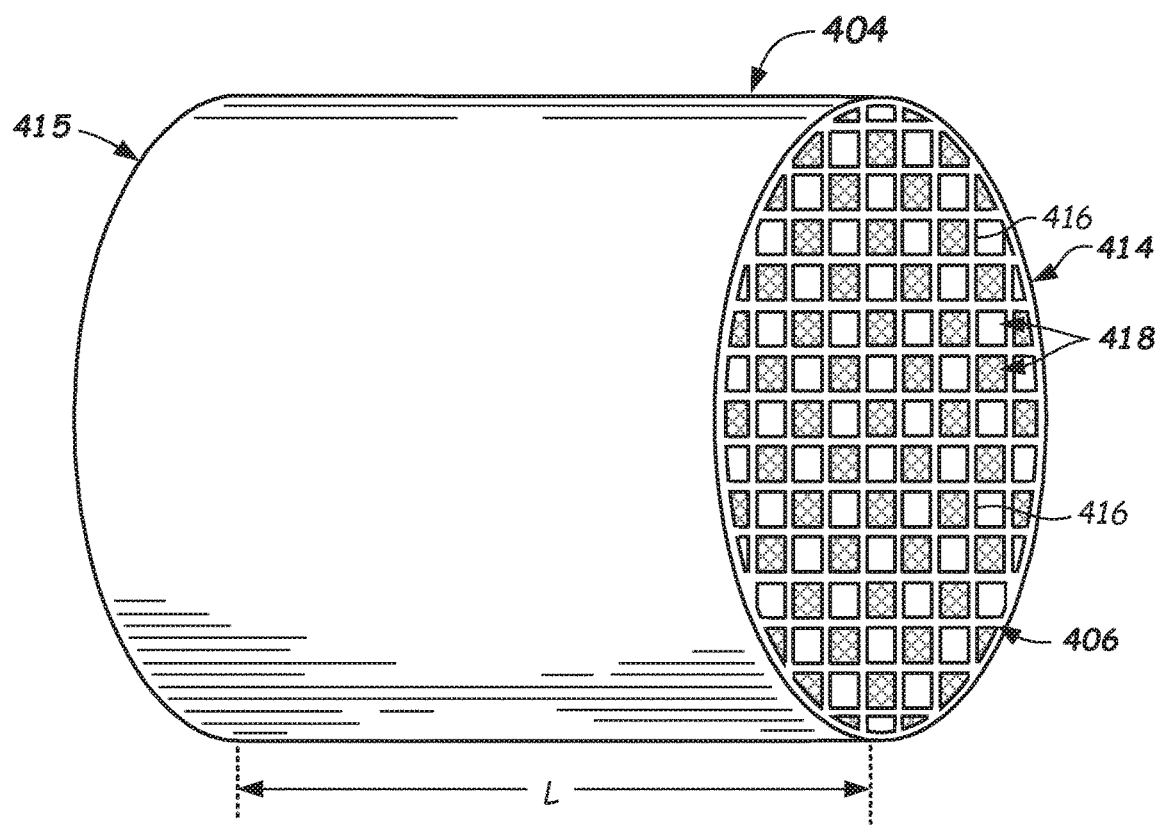
FIG. 4A schematically illustrates a perspective view of a honeycomb body that is embodied as a plugged honeycomb body to be used in a particulate filter according to one or more embodiments of the disclosure.
Figure 4B:
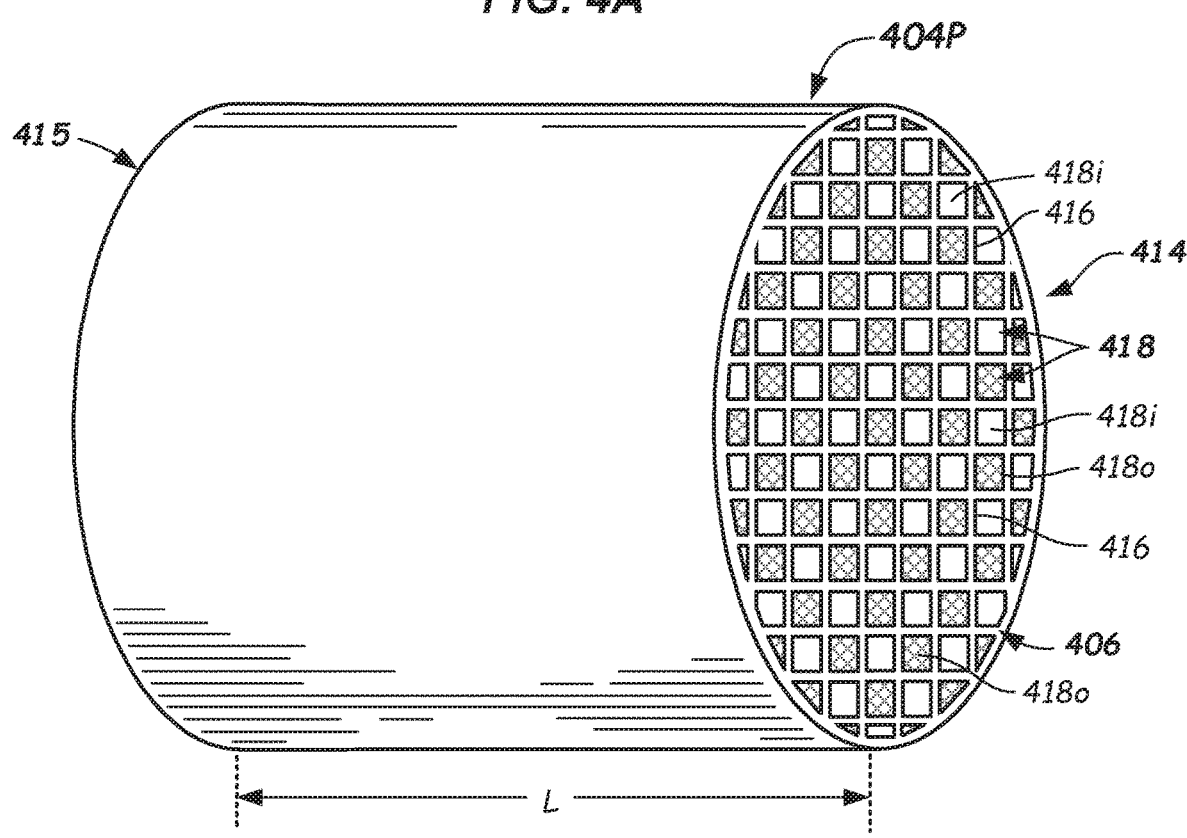
FIG. 4B schematically illustrates a perspective view of a honeycomb body that is embodied as a flow through honeycomb body according to one or more embodiments of the disclosure.
Figure 4C:
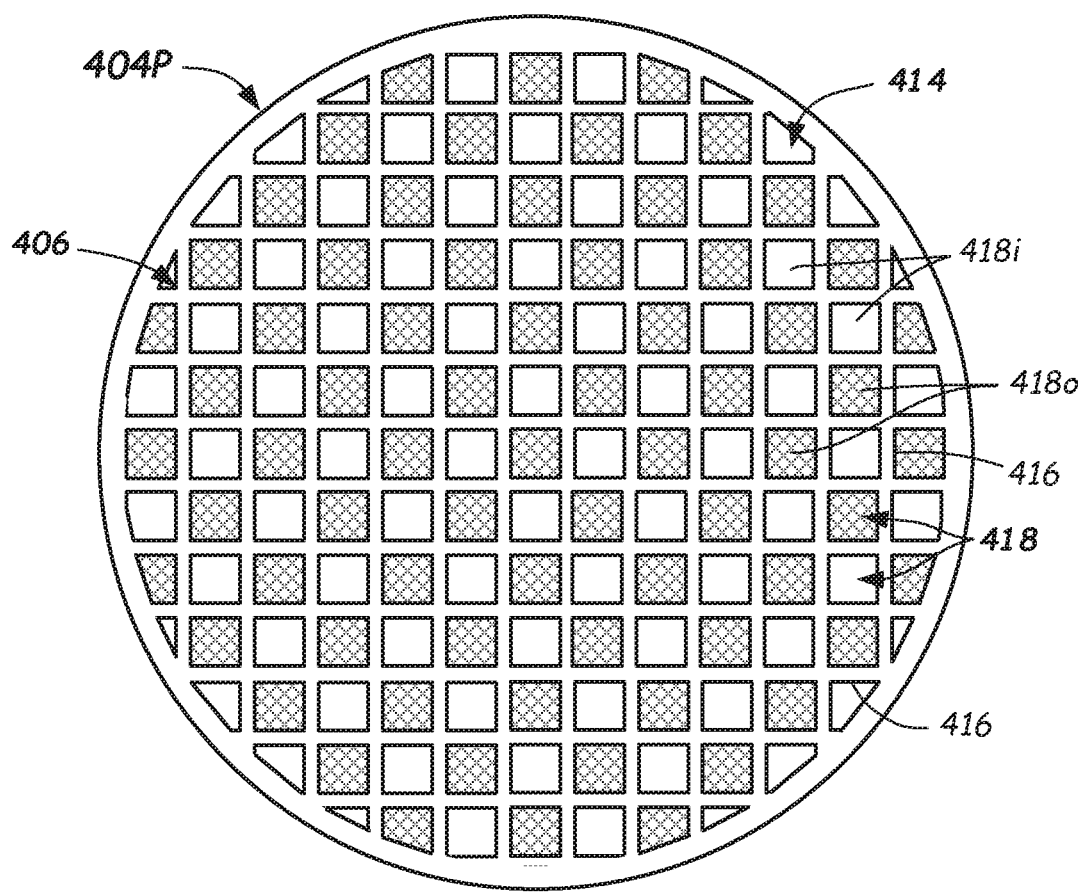
FIG. 4C schematically illustrates a front plan view of a honeycomb body that is embodied as a plugged honeycomb body to be used in a particulate filter according to one or more embodiments of the disclosure.

FIG. 4A schematically illustrates an isometric view of an example of a honeycomb body 404 that may be formed from the honeycomb extrudate 104 after having been cut, dried, and fired and possibly having other processes (e.g., in some embodiments, a skin layer can be applied after extrusion, which is an after applied skin). FIGS. 4B and 4C schematically illustrate an isometric view of a plugged honeycomb body 404P and of an inlet end 414 of the plugged honeycomb body 404P.

Figure 4D:
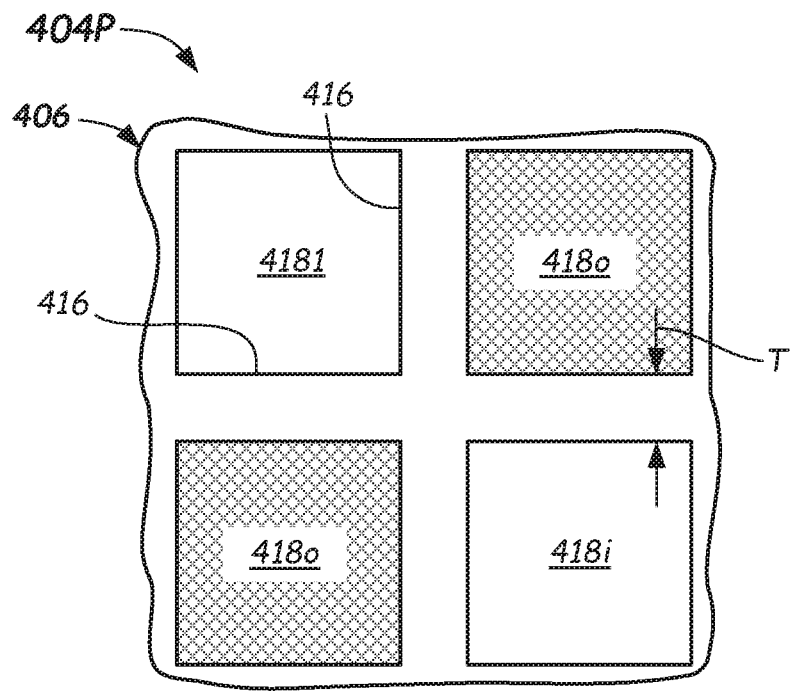
FIG. 4D schematically illustrates an enlarged, front plan view of a configuration of four channels of a honeycomb body according to one or more embodiments of the disclosure.

The honeycomb body 404 can be cut to length L extending between the inlet end 414 and an outlet end 415. FIG. 4D schematically illustrates four channels 418 of the honeycomb structure 406 in the honeycomb body 404.

The honeycomb body 404 can comprise a honeycomb structure 406 comprising a plurality of walls 416 (e.g., porous walls) forming channels 418 extending the length L of the honeycomb body 404. In some embodiments, such as applications where the honeycomb body 404P (FIG. 4B) is implemented in a particulate filter, the channels 418 are plugged. Channels 418 plugged proximate the inlet end 414 are referred to as outlet channels 418o and channels 418 plugged proximate the outlet end 415 are referred to as inlet channels 418i. In the embodiment depicted in FIGS. 4A-4D the outlet channels 418o are shown as shaded.

The honeycomb bodies 404, 404P may comprise a channel density (CD), after firing, in the range of about 15.5 channels per square cm (cpscm) to about 232.5 cpscm (about 100 cells per square inch (cpsi) to about 1,500 cpsi). In some embodiments, the walls 416 have a transverse thickness T of about 0.038 mm to about 1.52 mm (about 0.0015 inch to 0.060 inch). For example, the honeycomb structure geometries of the final honeycomb body 404, 400P may be 400 cpsi with a wall thickness T of about 0.008 inch (a 400/8 configuration) or optionally comprising a wall thickness T of about 0.006 inch (a 400/6 configuration). In other embodiments, the walls 416 may have a wall thickness T of 0.006 inch (0.152 mm) or less, or a wall thickness T of 0.004 inch (0.102 mm) or less, in some embodiments. Other geometries of the honeycomb structure 406 of the honeycomb body 404, 404P can comprise, for example, CD of about 400 cells/in$^2$ (about 62 cells/cm$^2$) or greater, CD of about 600 cells/in$^2$ (about 93 cells/cm$^2$) or greater, or even CD of about 900 cells/in$^2$ (about 139.5 cells/cm$^2$) or greater.

The walls 416 forming the honeycomb structure 406 are preferably porous, and preferably comprise open interconnected porosity. The walls 416 forming the channels 418 of the honeycomb structure 406 may be coated with one or more different materials, wherein in some embodiments the materials can be applied so as to be disposed predominantly within pores of the walls 416. For example, if the honeycomb body 404 (flow through substrate) is used in a catalytic converter, at least some of the pores in the walls 416 may comprise a catalyst disposed therein. In other embodiments, the honeycomb body 404P may comprise plugs and may be used in a particulate filter, such as where the walls 416 allow exhaust gas to pass through the transverse thickness of walls 416. In such embodiments, the walls 416 can filter out particles flowing in the flow (e.g., exhaust gas stream).

In some embodiments, the average bulk porosity (% P) of the walls 416 may be in a range from 25% to 70%, or in some embodiments in a range from 40% to 70%. In other embodiments, the average bulk porosity may be in a range from 25% or greater to 50% for low porosity walls 416 and in a range from greater than 50% to 70% for high porosity walls 416. In some embodiments, the median pore diameter $d_{50}$ of the pores in the walls 416 can be in a range from 11.0 μm to 25.0 μm. % P and $d_{50}$ are measured by mercury porosimetry.

Figure 5:
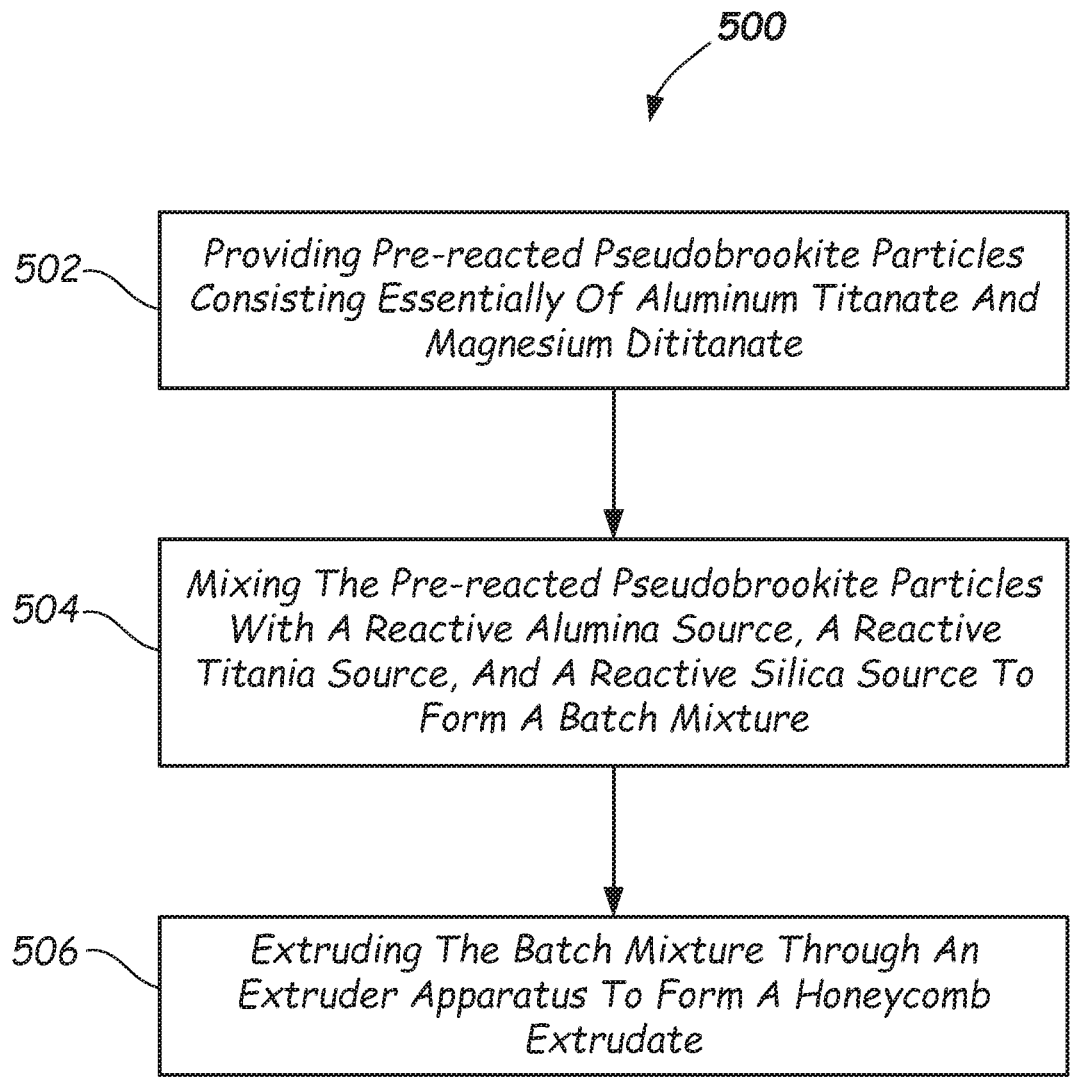
FIG. 5 illustrates a flowchart describing a method of manufacturing a honeycomb extrudate according to one or more embodiments of the disclosure.

In another aspect, a method of manufacturing a honeycomb extrudate is provided. The method 500 forms an extrudate (e.g., honeycomb extrudate 104) as is outlined in a flowchart of FIG. 5. The method 500 may comprise, in 502, providing pre-reacted pseudobrookite particles consisting essentially of aluminum titanate and magnesium dititanate. The method further comprises, in 504, mixing the pre-reacted pseudobrookite particles with a reactive alumina source, a reactive titania source, and a reactive silica source to form a batch mixture (e.g., batch mixture 116). The method further comprises, in 506, extruding the batch mixture through an extruder apparatus (e.g., extruder apparatus 100) to form a honeycomb extrudate (e.g., honeycomb extrudate 104). The honeycomb extrudate 104 is cut, dried and fired to for the honeycomb body 404 (FIG. 4A). The firing cycle can be as described herein. Optionally, some or all of the channels 418 can be plugged to form a plugged honeycomb body 404P. Any suitable plugging method can be used.

Porous ceramic bodies (e.g., porous ceramic honeycomb bodies 404, 404P) manufactured from the batch mixtures comprising pre-reacted PB consisting essentially of AT and MT2 as described herein can, after firing, exhibit suitable open interconnected porosity and microstructure for use in a catalyst supports and/or particulate filters. For example, in some embodiments, a relatively large median pore diameter (MPD), high porosity (% P), good strength and low coefficient of thermal expansion (CTE) may be provided that enable both low pressure drop and good thermal shock resistance when embodied as a particulate filter. Moreover, suitably lower porosity and median pore diameter may be provided for flow-through substrates.

In one set of embodiments herein, a batch mixture is disclosed comprising: pre-reacted pseudobrookite particles consisting essentially of aluminum titanate and magnesium dititanate; a reactive alumina source; a reactive titania source; and a reactive silica source. In some embodiments, the pre-reacted pseudobrookite particles comprise less than or equal to 33 wt. % of a total amount of inorganics in the batch mixture. In some embodiments, the pre-reacted pseudobrookite particles comprise a range from 0.01 wt. % to 33 wt. % of a total amount of inorganics in the batch mixture. In some embodiments, the pre-reacted pseudobrookite particles comprise a range from 0.01 wt. % to 5.0 wt. % of a total amount of inorganics in the batch mixture. In some embodiments, the pre-reacted pseudobrookite particles comprise a range from 0.1 wt. % to 2.0 wt. % of a total amount of inorganics in the batch mixture. In some embodiments, the pre-reacted pseudobrookite particles in the batch mixture comprise a particle size distribution exhibiting a median particle diameter of less than or equal to 20 μm. In some embodiments, the pre-reacted pseudobrookite particles comprise a particle size distribution having a median particle size of less than or equal to 5 μm. In some embodiments, the pre-reacted pseudobrookite particles comprise a particle size distribution having a median particle size of less than or equal to 1 μm. In some embodiments, the reactive titania source comprises titanium dioxide. In some embodiments, the reactive titania source comprises a range from 10 wt. % to 40 wt. % of a total amount of inorganics in the batch mixture. In some embodiments, the reactive titania source comprises a range from 20 wt. % to 34 wt. % of the total amount of inorganics in the batch mixture. In some embodiments, the reactive alumina source comprises calcined alumina. In some embodiments, the reactive alumina source comprises hydrated alumina. In some embodiments, the reactive alumina source comprises a range from 20 wt. % to 55 wt. % based on a total amount of inorganics in the batch mixture. In some embodiments, the reactive silica source comprises a range from 6 wt. % to 15 wt. % based on a total amount of inorganics in the batch mixture. In some embodiments, the pre-reacted pseudobrookite particles consist essentially of aluminum titanate in a range from 70 wt. % to 99 wt. % and magnesium dititanate in a range from 1 wt. % to 30 wt. %. In some embodiments, the pre-reacted pseudobrookite particles consist essentially of aluminum titanate in a range from 75 wt. % to 82 wt. % and magnesium dititanate in a range from 18 wt. % to 25 wt. %. In some embodiments, the mixture further comprises a reactive magnesia source; in some embodiments, the reactive magnesia source comprises talc; in some embodiments, the magnesia source a range from 13 wt. % to 20 wt. % based on a total amount of inorganics in the batch mixture. In some embodiments, the batch mixture further comprises a pore former comprising a median particle diameter in a range of from 3 μm to 50 μm.

In another set of embodiments, the batch mixture comprises: pre-reacted pseudobrookite particles consisting essentially of 70 wt. % to 99 wt. % of aluminum titanate and 1 wt. % to 30 wt. % of magnesium dititanate; a reactive alumina source; a reactive titania source; a reactive magnesia source; and a reactive silica source. In some embodiments, the pre-reacted pseudobrookite particles comprise magnesium dititanate in a range from 18 wt. % to 25 wt. %. In some embodiments, the pre-reacted pseudobrookite particles comprises 1 wt. % to 33 wt. % of all inorganics in the batch mixture. In some embodiments, the pre-reacted pseudobrookite particles comprises 9 wt. % to 33 wt. % based on a total amount of reactive inorganics in the batch mixture. In some embodiments, the pre-reacted pseudobrookite particles comprises a median particle diameter $d_{50}$ ranging from 10 μm to 40 μm. In some embodiments, the reactive titania source comprises titanium dioxide. In some embodiments, the reactive titania source comprises 10 wt. % to 35 wt. % based on a total amount of inorganics in the batch mixture. In some embodiments, the reactive titania source comprises 15 wt. % to 32 wt. % based on a total amount of inorganics in the batch mixture. In some embodiments, the reactive titania source comprises a particle size distribution having a median particle diameter of between about 0.10 μm and 0.5 μm. In some embodiments, the reactive alumina source comprises calcined alumina. In some embodiments, the reactive alumina source comprises 15 wt. % to 50 wt. % based on a total amount of inorganics in the batch mixture. In some embodiments, the reactive alumina source comprises a particle size distribution having a median particle diameter in a range of from 1 μm to 40 μm. In some embodiments, the reactive alumina source comprises a particle size distribution exhibiting a median particle diameter of in a range from 5 μm to 30 μm. In some embodiments, the reactive silica source comprises crystalline silica. In some embodiments, the reactive silica source comprises talc. In some embodiments, the reactive silica source comprises a range from 5 wt. % to 20 wt. % based on a total amount of inorganics in the batch mixture. In some embodiments, the batch mixture further comprises a pore former in a range from 5 wt. % to 50 wt. % SAT to a total amount of inorganics in the batch mixture. In some embodiments, the batch mixture further comprises a pore former, wherein the pore former comprises a particle size distribution having a median particle diameter in a range from 3 μm to 50 μm.

In another set of embodiments, a method of manufacturing a honeycomb body is disclosed herein, the method comprising: providing pre-reacted pseudobrookite particles consisting essentially of aluminum titanate and magnesium dititanate; mixing the pre-reacted pseudobrookite particles with a reactive alumina source, a reactive titania source, and a reactive silica source to form a batch mixture; and extruding the batch mixture through an extruder apparatus to form a honeycomb extrudate. In some embodiments, the pre-reacted pseudobrookite particles comprise 1 wt. % to 30 wt. % magnesium dititanate. In some embodiments, the pre-reacted pseudobrookite particles comprise 18 wt. % to 25 wt. % magnesium dititanate. In some embodiments, the method further comprises firing the honeycomb extrudate at a peak firing temperature in a range from 1,300° C. to 1,600° C. for at least 3.5 hours. In some embodiments, the method comprises firing the honeycomb extrudate at a peak firing temperature of at least 1,330° C. for at least 10 hours. In some embodiments, the method comprises firing the honeycomb extrudate at a peak firing temperature in a range from 1,350° C. to 1,435° C. for at least 3.5 hours. In some embodiments, the method comprises firing the honeycomb extrudate at a peak firing temperature of 1,405° C. or more, for less than or equal to 8 hours. In some embodiments, the method comprises firing the honeycomb extrudate at a peak firing temperature of 1,405° C. or more, for less than or equal to 4 hours. In some embodiments, the method comprises firing the honeycomb extrudate at a peak firing temperature of at least 1,405° C. and less than 1435° C., for at least 3.5 hours and less than or equal to 8 hours. In some embodiments, the method comprises firing the honeycomb extrudate at a peak firing temperature in a range of from 1330° C. to 1360° C. for less than or equal to 25 hours. In some embodiments, the method comprises drying and firing the honeycomb extrudate to achieve the honeycomb body comprising a CTE of $5.0 \times 10^{-7}/°$ C. (25° C. to 800° C.) or less. In some embodiments, the method comprises drying and firing the honeycomb extrudate to achieve the honeycomb body comprising a CTE of $3.0 \times 10^{-7}/°$ C. (25° C. to 800° C.) or less. In some embodiments, the method comprises drying and firing the honeycomb extrudate to achieve the honeycomb body comprising a CTE of $0.0 \times 10^{-7}/°$ C. (25° C. to 800° C.) or less.

In another set of embodiments, a method of making a ceramic body is disclosed herein, the method comprising: mixing together a batch mixture comprising a total amount of inorganic particles comprised of a first quantity of particles and a second quantity of particles, wherein the first quantity of particles comprises constituents capable of producing aluminum titanate via reactive sintering at one or more reactive sintering temperatures, wherein the first quantity of particles comprises a reactive alumina source, a reactive titania source, and a reactive silica source, and wherein the second quantity of particles comprises pseudobrookite crystalline particles consisting essentially of aluminum titanate and magnesium dititanate, wherein the pseudobrookite crystalline particles are stable with respect to the first quantity of particles at the one or more reactive sintering temperatures; and shaping the mixture into a green ceramic body comprising the total amount of inorganic particles; and heating the green ceramic body at the one or more reactive sintering temperatures and for one or more times sufficient to cause the reactive alumina source, the reactive titania source, and the reactive silica source to reactively sinter and to form the ceramic body with a predominant solid state phase, wherein the predominant solid state phase consists essentially of pseudobrookite crystalline aluminum titanate. In some embodiments, the ceramic body further comprises at least one non-pseudobrookite crystalline phase. In some embodiments, the ceramic body further comprises at least one amorphous phase. In some embodiments, pseudobrookite crystalline aluminum titanate is formed by the reactive sintering of the reactive alumina source, the reactive titania source, and the reactive silica source. In some embodiments, the pseudobrookite crystalline particles present in the green ceramic body constitute less than or equal to 33 wt. % of the total amount of inorganic particles. In some embodiments, the pseudobrookite crystalline particles constitute 0.01 to 33 wt. % of the total amount of inorganic particles. In some embodiments, the pseudobrookite crystalline particles constitute 0.01 to 5.0 wt. % of the total amount of inorganic particles. In some embodiments, the pseudobrookite crystalline particles constitute 0.1 to 2.0 wt. % of the total amount of inorganic particles. In some embodiments, the median particle diameter of the pseudobrookite crystalline particles is less than or equal to 20 μm. In some embodiments, the median particle diameter of the pseudobrookite crystalline particles is less than or equal to 5 μm. In some embodiments, the median particle diameter of the pseudobrookite crystalline particles is less than or equal to 1.0 μm. In some embodiments, the reactive titania source comprises titanium dioxide. In some embodiments, the reactive titania source constitutes 10 wt. % to 40 wt. % of the total amount of inorganic particles. In some embodiments, wherein the reactive titania source constitutes 20 wt. % to 34 wt. % of the total amount of inorganic particles. In some embodiments, the reactive alumina source comprises calcined alumina, hydrated alumina, or both. In some embodiments, the reactive alumina source constitutes 20 wt. % to 55 wt. % of the total amount of inorganic particles. In some embodiments, the reactive alumina source constitutes 6 wt. % to 15 wt. % of the total amount of inorganic particles. In some embodiments, the pseudobrookite crystalline particles consist essentially of 70 wt. % to 99 wt. % aluminum titanate and 1 wt. % to 30 wt. % magnesium dititanate. In some embodiments, the pseudobrookite crystalline particles consist essentially of 75 wt. % to 82 wt. % aluminum titanate and 18 wt. % to 25 wt. % magnesium dititanate. In some embodiments, the pre-reacted pseudobrookite particles consist essentially of aluminum titanate in a range from 75 wt. % to 82 wt. % and magnesium dititanate in a range from 18 wt. % to 25 wt. %. In some embodiments, the first quantity of particles further comprises a reactive magnesia source. In some embodiments, the reactive magnesia source comprises talc. In some embodiments, the reactive magnesia source constitutes 13 wt. % to 20 wt. % of the total amount of inorganic particles. In some embodiments, the batch mixture further comprises a pore former having a median particle diameter of 3 to 50 μm. In some embodiments, the batch mixture further comprises a pore former in an amount of 5 wt. % to 50 wt. % SAT to the total amount of inorganic particles. In some embodiments, the green ware is heated to a temperature in a range from 1,300° C. to 1,600° C. for at least 3.5 hours. In some embodiments, the green ware is heated to a temperature of 1,330° C. or more for at least 10 hours. In some embodiments, the green ware is heated to a temperature in a range from 1,350° C. to 1,435° C. for at least 3.5 hours. In some embodiments, the green ware is heated to a temperature of 1,405° C. or more for 8 hours or less. In some embodiments, the green ware is heated to a temperature of 1,405° C. or more for 4 hours or less. In some embodiments, the green ware is heated to a temperature of 1,405° C. to 1435° C. for 3.5 to 8 hours. In some embodiments, the green ware is heated to a temperature of 1330° C. to 1360° C. for 25 hours or less. In some embodiments, the ceramic body exhibits a CTE of less than or equal to $5.0 \times 10^{-7}$/° C. (25° C. to 800° C.). In some embodiments, the ceramic body exhibits a CTE of less than or equal to $3.0 \times 10^{-7}$/° C. (25° C. to 800° C.). In some embodiments, the ceramic body exhibits a CTE of less than or equal to $0.0 \times 10^{-7}$/° C. (25° C. to 800° C.). In some embodiments, the shaping comprises extruding the mixture through a honeycomb extrusion die.

In another set of embodiments, a batch mixture is disclosed herein comprising: a total amount of inorganic particles comprised of a first quantity of particles and a second quantity of particles, wherein the first quantity of particles comprises constituents capable of producing aluminum titanate via reactive sintering at one or more reactive sintering temperatures, wherein the first quantity of particles comprises a reactive alumina source, a reactive titania source, and a reactive silica source, wherein the second quantity of particles comprises pseudobrookite crystalline particles consisting essentially of aluminum titanate and magnesium dititanate, wherein the pseudobrookite crystalline particles are stable with respect to the first quantity of particles at the one or more reactive aluminum-titanate-producing sintering temperatures. In some embodiments, the pseudobrookite crystalline particles constitute less than or equal to 33 wt. % of the total amount of inorganic particles. In some embodiments, the pseudobrookite crystalline particles constitute 0.01 to 33 wt. % of the total amount of inorganic particles. In some embodiments, the pseudobrookite crystalline particles constitute 0.01 to 5.0 wt. % of the total amount of inorganic particles. In some embodiments, the pseudobrookite crystalline particles constitute 0.1 to 2.0 wt. % of the total amount of inorganic particles. In some embodiments, the median particle diameter of the pseudobrookite crystalline particles is less than or equal to 20 μm. In some embodiments, the median particle diameter of the pseudobrookite crystalline particles is less than or equal to 5 μm. In some embodiments, the median particle diameter of the pseudobrookite crystalline particles is less than or equal to 1.0 μm. In some embodiments, the reactive titania source comprises titanium dioxide. In some embodiments, the reactive titania source constitutes 10 wt. % to 40 wt. % of the total amount of inorganic particles. In some embodiments, the reactive titania source constitutes 20 wt. % to 34 wt. % of the total amount of inorganic particles. In some embodiments, the reactive alumina source comprises calcined alumina, hydrated alumina, or both. In some embodiments, the reactive alumina source constitutes 20 wt. % to 55 wt. % of the total amount of inorganic particles. In some embodiments, the reactive alumina source constitutes 6 wt. % to 15 wt. % of the total amount of inorganic particles. In some embodiments, the pseudobrookite crystalline particles consist essentially of 70 wt. % to 99 wt. % aluminum titanate and 1 wt. % to 30 wt. % magnesium dititanate. In some embodiments, the pseudobrookite crystalline particles consist essentially of 75 wt. % to 82 wt. % aluminum titanate and 18 wt. % to 25 wt. % magnesium dititanate. In some embodiments, the pre-reacted pseudobrookite particles consist essentially of aluminum titanate in a range from 75 wt. % to 82 wt. % and magnesium dititanate in a range from 18 wt. % to 25 wt. %. In some embodiments, the first quantity of particles further comprises a reactive magnesia source. In some embodiments, the reactive magnesia source comprises talc. In some embodiments, the reactive magnesia source constitutes 13 wt. % to 20 wt. % of the total amount of inorganic particles. In some embodiments, the batch mixture further comprises a pore former having a median particle diameter of 3 to 50 μm. In some embodiments, the batch mixture further comprises a pore former in an amount of 5 wt. % to 50 wt. % SAT to the total amount of inorganic particles.

It will be apparent to those skilled in the art that various modifications and variations can be made in the present disclosure without departing from the scope of the disclosure. Thus, it is intended that the present disclosure covers the modifications and variations of this disclosure provided they come within the scope of the appended claims and their equivalents.

What is claimed is:

1. A method of making a ceramic body, the method comprising:
   mixing together a batch mixture comprising a total amount of inorganic particles comprised of a first quantity of particles and a second quantity of particles, wherein the first quantity of particles comprises constituents capable of producing aluminum titanate via reactive sintering at one or more reactive sintering temperatures, wherein the first quantity of particles comprises a reactive alumina source, a reactive titania source, and a reactive silica source, and wherein the second quantity of particles comprises pre-reacted crystalline particles comprising aluminum titanate in an amount from 70 wt % to 99 wt % and magnesium dititanate in an amount from 1 wt % to 30 wt % relative to the total amount of inorganic particles, wherein the pre-reacted crystalline particles have a pseudobrookite type crystal structure and are stable with respect to the first quantity of particles at the one or more reactive sintering temperatures;

shaping the batch mixture into a green ceramic body comprising the total amount of inorganic particles; and heating the green ceramic body at the one or more reactive sintering temperatures and for one or more times sufficient to cause the reactive alumina source, the reactive titania source, and the reactive silica source to reactively sinter and form the ceramic body with a predominant solid state phase comprising crystalline aluminum titanate having the pseudobrookite type crystal structure, wherein the pre-reacted crystalline particles present in the green ceramic body constitute less than or equal to 33 wt. % of the total amount of inorganic particles.

2. The method of claim 1 wherein the ceramic body further comprises at least one crystalline phase that does not have the pseudobrookite type crystal structure.

3. The method of claim 1 wherein the ceramic body further comprises at least one amorphous phase.

4. The method of claim 1 wherein the crystalline aluminum titanate in the ceramic body is formed by the reactive sintering of the reactive alumina source, the reactive titania source, and the reactive silica source.

5. The method of claim 1 wherein the pre-reacted crystalline particles constitute 0.01 to 33 wt. % of the total amount of inorganic particles.

6. The method of claim 1 wherein the pre-reacted crystalline particles constitute 0.01 to 5.0 wt. % of the total amount of inorganic particles.

7. The method of claim 1 wherein the pre-reacted crystalline particles constitute 0.1 to 2.0 wt. % of the total amount of inorganic particles.

8. The method of claim 1 wherein a median particle diameter of the pre-reacted crystalline particles is less than or equal to 20 µm.

9. The method of claim 1 wherein a median particle diameter of the pre-reacted crystalline particles is less than or equal to 5 µm.

10. The method of claim 1 wherein a median particle diameter of the pre-reacted crystalline particles is less than or equal to 1.0 µm.

11. The method of claim 1 wherein the reactive titania source comprises titanium dioxide.

12. The method of claim 1 wherein the reactive titania source constitutes 10 wt. % to 40 wt. % of the total amount of inorganic particles.

13. The method of claim 1 wherein the reactive titania source constitutes 20 wt. % to 34 wt. % of the total amount of inorganic particles.

14. The method of claim 1 wherein the reactive alumina source comprises calcined alumina, hydrated alumina, or both.

15. The method of claim 1 wherein the reactive alumina source constitutes 20 wt. % to 55 wt. % of the total amount of inorganic particles.

16. The method of claim 1 wherein the reactive silica source constitutes 6 wt. % to 15 wt. % of the total amount of inorganic particles.

17. The method of claim 1 wherein the pre-reacted crystalline particles comprise 75 wt. % to 82 wt. % aluminum titanate and 18 wt. % to 25 wt. % magnesium dititanate.

18. The method of claim 1 wherein a CTE of the ceramic body is less than or equal to $5.0 \times 10^{-7}/°$ C. over a temperature range from 25° C. to 800° C.

19. The method of claim 1 wherein a CTE of the ceramic body is less than or equal to $3.0 \times 10^{-7}/°$ C. over a temperature range from 25° C. to 800° C.

20. The method of claim 1 wherein a CTE of the ceramic body is less than or equal to $0.0 \times 10^{-7}/°$ C. over a temperature range from 25° C. to 800° C.

21. The method of claim 2 wherein the at least one crystalline phase that does not have the pseudobrookite type crystal structure comprises strontium.

22. The method of claim 2 wherein the at least one crystalline phase that does not have the pseudobrookite type crystal structure comprises cordierite.

23. A method of making a ceramic body, the method comprising:

mixing together a batch mixture comprising a total amount of inorganic particles comprised of a first quantity of particles and a second quantity of particles, wherein the first quantity of particles comprises constituents capable of producing aluminum titanate via reactive sintering at one or more reactive sintering temperatures, wherein the first quantity of particles comprises a reactive alumina source, a reactive titania source, and a reactive silica source, and wherein the second quantity of particles comprises pre-reacted crystalline particles comprising aluminum titanate in an amount from 70 wt % to 99 wt % relative to the total amount of inorganic particles in the batch mixture, wherein the pre-reacted crystalline particles have a pseudobrookite type crystal structure and are stable with respect to the first quantity of particles at the one or more reactive sintering temperatures;

shaping the batch mixture into a green ceramic body, the pre-reacted crystalline particles present in the green ceramic body in an amount from equal to or greater than 0.01 wt. % to equal to or less than 5.0 wt. % of the total amount of inorganic particles in the green ceramic body;

heating the green ceramic body at the one or more reactive sintering temperatures and for one or more times sufficient to cause the reactive alumina source, the reactive titania source, and the reactive silica source to reactively sinter and form the ceramic body with a solid state phase comprising crystalline aluminum titanate having the pseudobrookite type crystal structure and in an amount from 63 wt % to 84 wt %; and wherein a CTE of the ceramic body is less than or equal to $5.0 \times 10^{-7}/°$ C. over a temperature range from 25° C. to 800° C.

24. The method of claim 23 wherein the pre-reacted crystalline particles comprise from 1 wt % to 30 wt. % magnesium dititanate.

25. The method of claim 23 wherein the pre-reacted crystalline particles comprise from 0.1 wt. % to 2.0 wt. % of the total amount of inorganic particles in the green ceramic body.

26. The method of claim 23, wherein the pre-reacted crystalline particles comprise from 0.1 wt. % to 0.2 wt. % of the total amount of inorganic particles in the green ceramic body.

* * * * *